3,562,183
METHOD OF OBTAINING VANADIUM-CONTAINING CATALYSTS FOR THE VAPOR-PHASE OXIDATION OF AROMATIC HYDROCARBONS
Alberto Sonz, Milan, Italy, assignor to Aziende Colori Nazionali Affini ACNA S.p.A., Milan, Italy, a corporation of Italy
Filed July 25, 1967, Ser. No. 655,871
Int. Cl. B01j *11/82*
U.S. Cl. 252—440                    1 Claim

ABSTRACT OF THE DISCLOSURE

Described is a method for the preparation of catalysts on the basis of vanadium-containing active products, for the oxidation of naphthalene to phthalic anhydride. The process is characterized in that an aqueous solution containing the compounds $V_2O_4$, $SO_3$ and $K_2O$ with $V_2O_4/SO_3/K_2O$ molar ratios comprised between 1/6/2 and 1/10/6, is adsorbed at a temperature comprised between 10° and 90° C. onto a natural or artificial porous support. The impregnated support is then subjected to a thermal treatment of calcination in a current of air.

Figure 1:
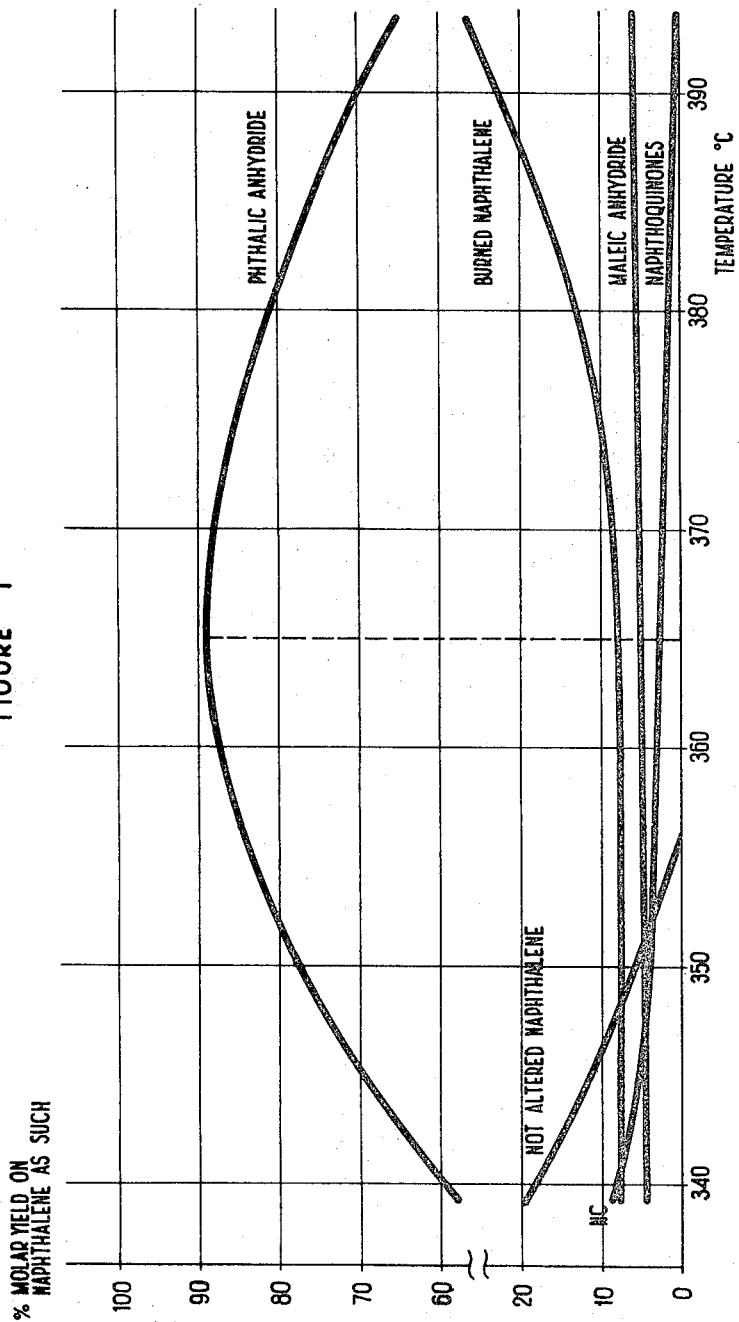

My invention relates to a method of obtaining vanadium-containing catalysts for use in vapor-phase oxidation of aromatic hydrocarbons. More particularly, my invention relates to a method of obtaining catalysts containing a vanadium oxide for vapor-phase oxidation of naphthaline to phthalic anhydride. A large number of studies have been carried out for several decades on the catalysts for the vapor-phase oxidation of naphthalene and phthalic anhydride and various patents relating to the methods of preparing such catalysts have been granted.

In general, the prior art with respect to fixed-bed reactors provides for the adhesion of catalytically active compounds to natural or synthetic inert supports, such as alumina, silica gel, Carborundum, pumice stone, etc. The oxidation generally takes place on the surface of the support. With fluidized-bed reactors, the catalytically active products are mixed or coprecipitated with aqueous gels of silicic acid or alumina and dried and calcined. Oxidation mainly occurs inside the pores of the catalyst pellet.

Recently, another way has been used to obtain fluidized-bed catalysts, namely the impregnation, at 350–400° C., of the porous support with the molten mass of active products. This technique is described in British Pat. 906,311 and in German Pat. 1,148,225.

Naphthalene means both the chemically pure product and commercial naphthalene containing thionaphthene, methyl-naphthalene and in general homologs of naphthalene, indane, etc., in various proportions.

The present invention relates to a method of preparing vanadium catalysts for the vapor-phase oxidation of naphthalene to phthalic anhydride and to the catalysts obtained by this method. The preparation of the catalysts of my invention is carried out by impregnating at room temperature, in suitably calculated ratios, porous supports selected on the basis of the specific conditions of the oxidation process, with solutions, having suitable concentration, of active or activable products; drying and calcining the mass obtained, with the active components thus adhering to the inner surface of the pores without closing the outer opening.

More particularly, my invention relates to a method of obtaining vanadium-containing catalysts for vapor-phase oxidation of naphthalene, by absorbing an aqueous solution comprising $V_2O_4$, $SO_3$ and $K_2O$ with $V_2O_4/SO_3/K_2O$ molar ratios comprised between 1/6/2 and 1/10/6, preferably 1/8/4, on a natural or artificial porous support and then subjecting the impregnated support to a thermal calcination treatment in an air current. It is possible to use as active products, products commercially available in any state of valency or even in combination with other elements or groups of elements which are volatile at the temperature of the calcination treatment, provided that they can give the mixtures having the aforementioned composition. In order to obtain the best results of the present invention, an aqueous solution consisting of potassium vanadyl disulfate and potassium bisulfate $$(VOSO_4 \cdot K_2SO_4 + 2KHSO_4)$$

in which vanadium is reduced to the valence 4 and to which solution activators or stabilizers, if desired, are added, is preferably used. Compounds with the other known valences, i.e. 2, 3, 5 and 7, have also been investigated. These compounds can also be used but less advantageously due to their lower solubility, stability, ease of preparation and economic convenience.

As supports silica-gel, alumina and other natural or artificial materials which are stable at the reaction temperature and have a suitable mechanical strength, thermal conductivity, porosity, specific surface, pore diameter and apparent volume, can be used. These characteristics have no critical values. However, in order to obtain the best results, commercially available silica-gels having the folfollowing properties are preferred:

Specific surface—250–800 m.$^2$/g.
Porosity—0.3–1.7 ml./g.
Pore diameter—20–200 A.
Apparent density—0.4–0.8 g./ml.
Granulometry—The most suitable one for the reactor in which the catalyst is to be used (e.g. for fixed bed: 2–5 mm.; for fluidized bed: 0.075–0.300 mm.).

The following two impregnation methods can be used:

(a) The porous support is immersed into an excess of active solution (air contained in the pores is quickly released). The solution adhering to the outer surface of the granules and that contained in the macropores of the support are removed by centrifugation in a water-extractor provided with a relative centrifugal power capable of removing the solution excess, the solution adhering to the outside surface of the granules and that contained in the support macropores. The solution thus removed can be recycled to the impregnation bath. The centrifuge can be operated at rates within 200–2000 gravities.

(b) The solution is sprayed or added dropwise to the support kept in agitation in revolving cylinders, in V-shaped mixers, in fluidized-bed reactors or in any other suitable apparatus. The impregnating solution volume should be lower than the volume of the support pores. Drying and final calcination have no critical conditions and can be carried out in the same impregnation apparatus provided that this apparatus is suitable therefor.

The porosity for each type of support is selected so as to reach a maximum of surface of impregnating salts per unit of catalyst volume, which in practice corresponds to a maximum catalytic activity and selectivity.

The concentration and density of the solution can reach 160 g. of active salts per 100 g. of water (100 g. of salts/100 ml. of solution). These very high solubility and density values are peculiar characteristics of the present invention and allow a variety of applications. It is thus possible to vary the concentration of the solution or the moisture already contained in the support in order to obtain perfectly uniform impregnations in each granule even with high percentages of active salts to support or, at will, to obtain support granules impregnated only in part or to a minimum extent. Thus, the support exerts, in turn, in the pores mostly still accessible from outside, such a catalytic or adsorption activity as to modify the rate of formation of phthalic anhydride, or to vary the mutual ratios between the various reaction products, and leads to a higher resistance to the poisons contained in the naphthalene of commercial purity.

It is a known fact that the formation of large amounts of naphthoquinones causes remarkable technical inconveniences, favoring the separation of tar pitches in the pipes and in the heat-exchangers and, in the prolonged purification treatments required, causes losses of a portion of the raw phthalic anhydride produced. It is also known that the sulphurated impurities contained in technical naphthalene, by catalytic action are oxidized to sulfuric anhydride and tend to increase the apparent density of the catalyst. This causes a partial removal of the active salts and agglomerations of the various pellets, resulting in a decrease of the active surface and impairment of the fluidization.

As compared with conventional methods, my method shows the following advantages:

(a) I can obtain catalysts having, when desired, a higher specific surface and a higher porosity and therefore a higher catalytic activity and selectivity, for the same concentration of active compounds. The higher activity advantageously leads to temperatures of optimum yield remarkably lower than those usually adopted. The higher selectivity leads to a minimum or no formation of naphthoquinones.

(b) Conversely, if the activity is the same, a lower concentration of expensive active compounds is required.

(c) My method does not show critical conditions, and can be carried out quickly and economically in simple apparatuses with practically quantitative yields.

(d) It becomes easy to vary the catalyst quality for better adjustment to the desired use.

(e) Catalysts more resistant to poisons, friction and compression are obtained.

Figure 2:
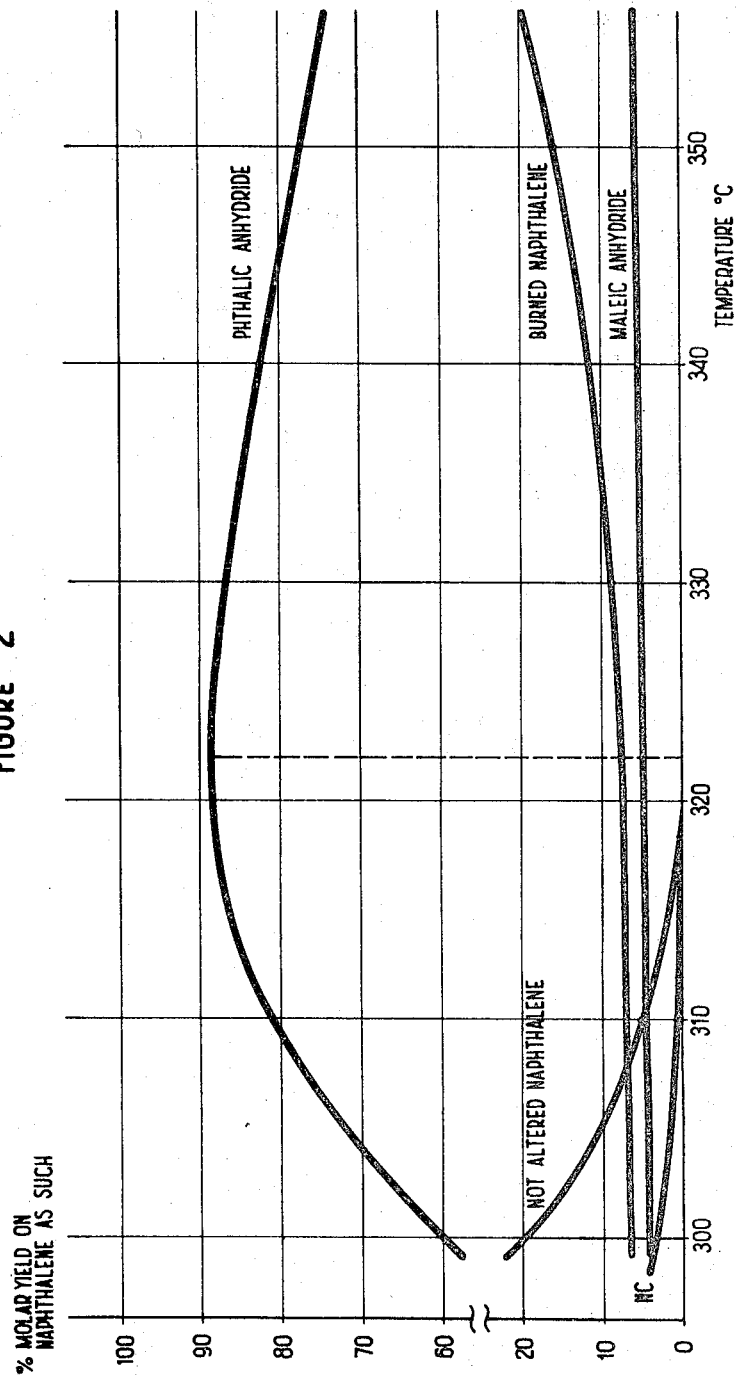

In the drawings:

FIG. 1 shows graphically the results of Example 1(b);
FIG. 2 shows graphically the results of Example 3.

The drawings are self-explanatory, particularly when considered with the above-mentioned examples.

The following examples are to illustrate the invention without limiting its scope.

EXAMPLE 1

(a) Obtainment of the solution 698 g. of a 13.21% $H_2SO_4$ aqueous solution,
218.4 g. of $K_2SO_4$ (99.95%),
57.2 g. of $V_2O_5$ (99.65%)

are charged in above order in a 1000-ml. flask. The internal temperature of the mixture is adjusted at 60° C., while agitating. Through a suitable inlet tube, $SO_2$ is absorbed until it is rejected (at least 20 g. are required). The initial yellow-orange suspension, as the slightly exothermic reduction reaction of vanadium proceeds, becomes fluider, then green and finally clear with a brilliant blue color. The solution obtained has a density of 1.35 g./ml., is stable for years and contains 375 g. of salts (calculated at 400° C.). The concentration, 60.3 g. of salts per 100 g. of water, is already sufficient for various uses. When a higher concentration is required (100 g. of salts per 100 g. of water), the solution is evaporated under a residual vacuum of 60 mm. Hg at 50° C. with an outer bath at 60–65° C. Concentrations of 160–170 g. of salts per 100 g. of water at 60° C. should not be exceeded in order to avoid crystallization of $KHSO_4$. The solutions with a very high concentration must be used immediately in the warm (preferably at 50–60° C.) and if they crystallize, they must be diluted and suitably concentrated again.

(b) Impregnation 663 g. (490 ml.) of the above diluted solution, containing 250 g. of salts, are concentrated up to 500 g. or 330 ml. The solution is then dropped within 30 minutes in a rotating cylinder at a speed lower than the critical one (Perry Handbook Chemical Eng., 2nd Ed. page 1130); at 20–30° C. on 760 g. of silica gel dried at 150° C. and having the following characteristics:

Specific surface—340 m.$^2$/g.
Porosity—1.16 ml./g.
Pore diameter—140 A.
Apparent density—0.43 g./ml.
Granulometry—0.075–0.300 mm.

The solution is promptly adsorbed and the mass having a light blue color remains always dry and flowing. The catalyst mass is dried in an oven for 4 hours at 150° C. 1030 g. of a violet catalyst are obtained.

By calcination in a current of air for 4 hours at 380° C., it yields 1000 g. of a gold-yellow catalyst. Vanadium oxidation takes place at about 280° C. This oxidation may be carried out in the catalysis reactor itself by introducing directly the catalyst in the reduced form. This possibility represents a technical advantage due to the fact that the catalyst in the reduced form is more stable towards atmospheric moisture than the oxidized one. The catalyst is not uniform and contains about 60% of non-impregnated granules. It does not contain salts removable by sieving or salts adhering to the external surface of silica-gel granules. The specific surface is 200 m.$^2$/g.

The catalyst obtained according to this example is charged into a fluidized-bed reactor and activated at 380° C. for 10 hours with a current of air. Technical grade naphthalene (purity 98%; 1.3% of thionaphthene; 0.7% alpha-beta-methyl-naphthalene, indane, etc.) vaporized with hot air, is then passed, with the following catalysis conditions of industrial interest:

Specific feed—0.04–0.05 kg. naphthalene/kg. catalyst/hour
Kg. air/kg. naphthalene ratio—11.4
Contact time—4–6 seconds.

From the outcoming gases, after 30 hours of catalysis, the various reaction products can be quenched and determined. The molar yields, at the various temperatures of catalysis and calculated on the technical naphthalene charged, considered as pure, are reported in diagram 1.

The optimum yield is at 365° C. and corresponds to:

Phthalic anhydride—88.4% by mols (102.5% by weight)
Maleic anhydride—4.4% by mols
Naphthoquinones—1.6% by mols

EXAMPLE 2

300 g. of silica gel having characteristics as in Example 1(b) are immersed at room temperature into 750 ml. (1130 g.) of a concentrated solution containing 565 g. of active salts, prepared as in Example 1(a). The air contained in the pores spontaneously develops, i.e. bubbles out. After standing for 30 minutes, the whole is centrifuged for 5 minutes at 250 g. (gravity). The centrifuge can be operated at rates within 200–2000 gravities. 800 g. of impregnated silica gel having a light blue color and, after drying at 150° C., 570 g. having a violet color, are obtained. They are mixed with 460 g. of non-impregnated silica gel and are calcined at 380° C. to give 1000 g. of catalyst which looks like that of Example 1. The specific surface is 850 m.$^2$/g. In catalysis, under the conditions of Example 1(b), it gives the same yields but with an optimum temperature of 355° C.

EXAMPLE 3

663 g. equaling 490 ml. of the solution prepared as in Example 1(a) and containing 250 g. of salts, are diluted with water to 833 g.=660 ml. The solution is then added dropwise as in Example 1(b) onto 760 g. of silica gel dried at 150° C., having the following characteristics:

Specific surface—405 m.²/g.
Porosity—0.9 ml./g.
Pore diameter—89 A.
Apparent density—0.36 g./ml.
Granulometry—0.075–0.300 mm.

The procedure of Example 1(b) is then followed. 1000 g. of uniform light gold-yellow catalyst consisting of granules, all of them impregnated to the same extent, are obtained.

In a catalytic test for more than 200 hours, under the conditions adopted in Example 1(b), the catalyst gives the constant yields reported in diagram 2.

The optimum yield is obtained at 322° C. and corresponds to:

Phthalic anhydride—88.0% by mols (101.8% by weight)
Maleic anhydride—5.2% by mols
Naphthoquinones—0.1% by mols Naphthoquinones disappear at temperatures above 325° C., with colorless condensates.

EXAMPLE 4

810 g.=534 ml. of concentrated solution containing 405 g. of active salts, prepared as in Example 1(a), is added dropwise as in Example 1(b) onto 603 g. of silica gel dried at 150° C. and having characteristics as in Example 3. The procedure of Example 1(b) is then followed. 1000 g. of a uniform dark gold-yellow catalyst consisting of granules all of them impregnated to the same extent, are obtained. In the catalysis step, under the conditions adopted in Example 1(b), the optimum yield obtained at 330° C., corresponds to:

Phthalic anhydride—87.8% by mols (101.6% by weight)
Maleic anhydride—3.7% by mols
Naphthoquinones—0.01% by mols While a temperature of adsorption is shown as room temperature, i.e. about 20°–30° C., temperatures from about 10 to 90° C. are suitable.

I claim:

1. Catalysts on the basis of vanadium-containing active products, for the vapor-phase oxidation of naphthalene to phthalic anhydride, obtained by impregnating a porous carrier at a temperature comprised between 10 and 90° C. with an aqueous solution, having a volume about equal to the total volume of the pores of the carrier, said aqueous solution consisting essentially of the catalytic active components, potassium vanadyl disulfate, potassium bisulfate and sulfuric acid in a molar ratio from 1/6/2 to 1/10/6 expressed as $V_2O_4$, $SO_3$ and $K_2O$ and finally subjecting the impregnated porous carrier to a calcinating treatment with a current of hot air.

References Cited

UNITED STATES PATENTS

| | | | |
|---|---|---|---|
| 2,941,957 | 6/1960 | Pinchbeck et al. | 252—440 |
| 2,973,371 | 2/1961 | Chomitz et al. | 252—440X |
| 3,167,567 | 1/1965 | Nonnenmacher et al. | 252—440X |
| 3,215,644 | 11/1965 | Kakinoki et al. | 252—440 |
| 3,226,338 | 12/1965 | Riley et al. | 252—440 |

PATRICK P. GARVIN, Primary Examiner

U.S. Cl. X.R.

260—346.4